United States Patent
Rohde et al.

(10) Patent No.: US 6,846,021 B2
(45) Date of Patent: Jan. 25, 2005

(54) TUBE-END FITTING

(75) Inventors: Reiner Rohde, Malsfeld (DE); Andreas Rose, Vellmar (DE); Torsten Thomke, Baunatal (DE); Andreas Szczepaniak, Lohfelden (DE); Kurt Apel, Neuenstein (DE)

(73) Assignee: Ti Automotive (Fuldabruck) GmbH, Fuldabruck (DE)

( * ) Notice: Subject to any disclaimer, the term of this patent is extended or adjusted under 35 U.S.C. 154(b) by 0 days.

(21) Appl. No.: 10/423,820

(22) Filed: Apr. 25, 2003

(65) Prior Publication Data

US 2004/0036282 A1 Feb. 26, 2004

(30) Foreign Application Priority Data

May 4, 2002 (EP) .............................................. 02010003

(51) Int. Cl.⁷ ................................................ F16L 35/00
(52) U.S. Cl. ........................ 285/81; 285/305; 285/319; 285/91
(58) Field of Search ............................ 285/81, 91, 305, 285/319

(56) References Cited

U.S. PATENT DOCUMENTS

| | | | | |
|---|---|---|---|---|
| 5,332,268 A | * | 7/1994 | Godeau et al. ................ | 285/26 |
| 5,401,063 A | * | 3/1995 | Plosz ........................... | 285/81 |
| 5,628,531 A | * | 5/1997 | Rosenberg et al. ........... | 285/81 |
| 5,649,724 A | * | 7/1997 | Wiethorn ...................... | 285/93 |
| 5,653,475 A | * | 8/1997 | Scheyhing et al. ........... | 285/54 |
| 5,695,223 A | * | 12/1997 | Boticki ......................... | 285/23 |
| 5,725,257 A | * | 3/1998 | Sakane et al. ................ | 285/81 |
| 5,782,502 A | * | 7/1998 | Lewis ........................... | 285/87 |
| 5,860,677 A | * | 1/1999 | Martins et al. ............... | 285/26 |

* cited by examiner

Primary Examiner—Eric K. Nicholson
(74) Attorney, Agent, or Firm—Herbert Dubno; Andrew Wilford

(57) ABSTRACT

A tube end having an outwardly projecting ridge is secured in a fitting having a body formed with a seat centered on an axis and open axially rearwardly. The tube end is coaxially engageable in the seat, and a retaining clip on the body extends secantally across the seat and can move between an outer spread position engaging a respective inner surface of the seat and an inner retaining position spaced radially inward from the respective inner surface. The tube end when fully axially inserted in the seat is engaged axially outward of the ridge by the clip. A latch element can move between an outer freeing position generally clear of the clip and an inner locking position engaged outward of the clip between same and the respective inner surface and preventing the clip from moving from the inner retaining position to the outer spread position.

12 Claims, 3 Drawing Sheets

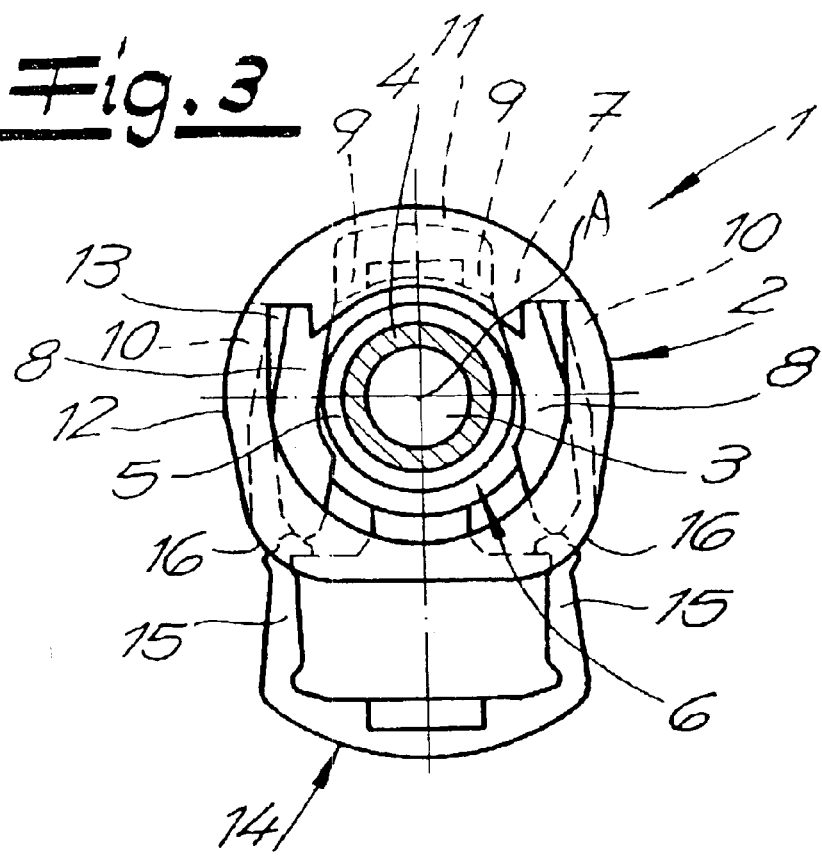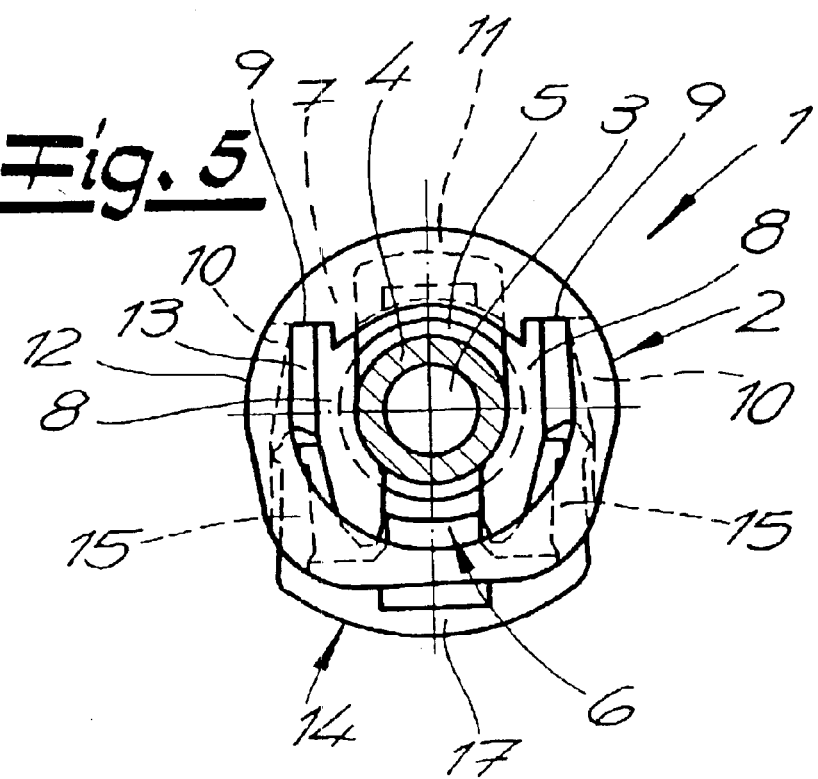

TUBE-END FITTING

FIELD OF THE INVENTION

The present invention relates to a tube fitting. More particularly this invention concerns a fitting adapted to be fitted to the end of a tube to allow it to be joined to another connection element or to another tube.

BACKGROUND OF THE INVENTION

In order to join a tube made of plastic, metal, or rubber to another tube, to a pipe fitting, or to a plumbing fixture, it is frequently necessary to provide the tube end with a special fitting that can mate. For instance one side can have a tubular outwardly tapered extension formed with sawtooth-section teeth so that it can be jammed into a rubber hose, or it can have an outwardly open annular groove of outwardly flaring radial dimension so that a plastic hose can be fitted to it and clamped in place.

On the side attached to the tube end the fitting typically has a seat into which the tube end, which may be provided with a radially outwardly projecting retaining formation either formed directly on it in a metal tube or constituted by a separate ferrule with a plastic tube, can fit. Typically the inner end of the seat is provided with a seal ring that engages snugly between the fitting and the tube end to form the necessary leak-free connection.

A clip mechanism is provided to retain the tube end in the seat, normally coacting with the retaining formation on the tube end. Such a mechanism operates automatically to secure the tube end in place when it is pushed home in the fitting. Normally the tube end, once locked in place, cannot be removed from the fitting and the fitting cannot be reused.

Another problem with the known fittings is that it is impossible to determine if in fact the tube end is fully engaged and retained in the fitting. The retaining clip may not have actually been engaged behind the retaining formation, but the tube end might be pushed far enough into the fitting that they are seemingly solidly connected together. Only when pressurized will the two parts separate, sometimes after some use. When used in a brake system, the result can be depressurization of the system and failure of the brakes.

OBJECTS OF THE INVENTION

It is therefore an object of the present invention to provide an improved tube-end fitting.

Another object is the provision of such an improved tube-end fitting which overcomes the above-given disadvantages, that is which provides an externally visible indication of whether the tube end is properly secured in the fitting.

Another object is to provide such a fitting which, if necessary, can release the tube end and be reused.

SUMMARY OF THE INVENTION

A tube end having an outwardly projecting ridge is secured in a fitting having according to the invention a body formed with a seat centered on an axis and open axially rearwardly. The tube end is coaxially engageable in the seat, and a retaining clip on the body extends secantally across the seat and can move between an outer spread position engaging a respective inner surface of the seat and an inner retaining position spaced radially inward from the respective inner surface. The tube end when fully axially inserted in the seat is engaged axially outward of the ridge by the clip. A latch element is displaceable between an outer freeing position generally clear of the clip and an inner locking position engaged outward of the clip between same and the respective inner surface and preventing the clip from moving from the inner retaining position to the outer spread position.

Such a fitting is ideal for use on a motor-vehicle fuel or brake line. The seat side of the fitting is connected to the brake or fuel line and the other side can be provided with a formation allowing this like to be connected to another line, to a wheel brake or master cylinder, or to a component of the engine. The ridge constituting the retaining formation on the tube end can be, in the case of a metal tube, an integral formation swaged right on the tube. Alternately it can be a separate metal ferrule carried on a plastic tube, or a fiber-reinforced plastic element mated to a plastic tube.

The latch element must move from its outer to its inner position in order to prevent the clip from moving into a position in which it can release the tube end. In fact the clip cannot move into its inner position if, for example, the clip is held in its spread position, pushed back by the ridge on the tube end. Thus the position of the latch element will give a clear indication as to whether the tube end is properly seated and retained in the fitting. If the tube end is not pushed far enough in to allow the clip to snap back into place behind it, the latch element cannot be pushed in, but if the latch element is pushed in, this is a sure indication that the clip is in its retaining position which can only happen when the tube end is fully inserted in the fitting.

According to the invention a seal ring in the seat axially inward of the clip engages snugly between the seat and the tube end when the tube end is fully inserted into the seat. This forms an excellent leak-proof connection.

The clip in accordance with the invention is at least partially elastically deformable and has a pair of legs extending secantally across the seat and each movable elastically radially of the axis between the spread and retaining positions relative to respective such inner surfaces. Thus the clip is U-shaped and has a bight unitarily formed with the legs. By making the bight U-shaped and the underlying surface of the fitting planar, it is possible to deflect the legs into the spread position by pushing the bight down against the fitting, allowing the tube end to be disconnected from the fitting with no damage to the clip. Thus the fitting can be reused or a new connection can be made to it with ease. The clip, like the fitting body, can be made of a durable plastic.

The latch element projects radially from the body in the outer freeing position and is relatively closely juxtaposed with the body in the inner locking position. This provides the above-discussed visual information as to whether the fitting is locked to the tube end or not. It also makes it possible to fit a tool under the latch element and pry it out into the outer freeing position, once again making the system of this invention reusable.

The latch element according to the invention has a pair of legs engageable in the inner locking position between the clip legs and the respective surfaces. Thus it also is U-shaped and has a bight interconnecting the respective legs. The spacing of the legs of the latch element is the same as the spacing of the legs of the clip when the clip is in the spread position, so in this position the clip legs block the latch-element legs and prevent it from being pushed into the inner position. Only when the clip legs move inward into the retaining position can the latch-element legs slide in behind them and block their subsequent outward movement.

The clip and latch element are dimensioned such that in the locking position of the latch element the clip cannot move into the spread position. The tube end is axially locked in the body in the retaining position of the clip by engagement of the clip axially rearward with the ridge.

BRIEF DESCRIPTION OF THE DRAWING

The above and other objects, features, and advantages will become more readily apparent from the following description, reference being made to the accompanying drawing in which:

FIG. 3 is an end view taken in the direction of arrow III of FIG. 2;

FIG. 5 is an end view taken in the direction of arrow V of FIG. 4.

SPECIFIC DESCRIPTION

Figure 1:
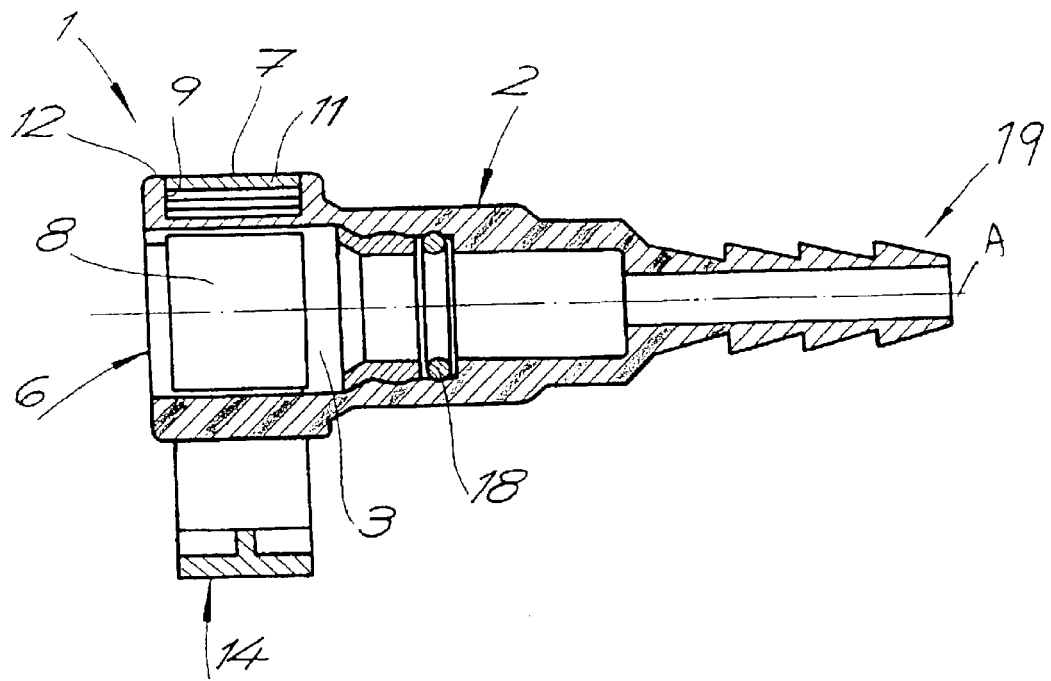
FIG. 1 is an axial section through the fitting according to the invention.
Figure 2:
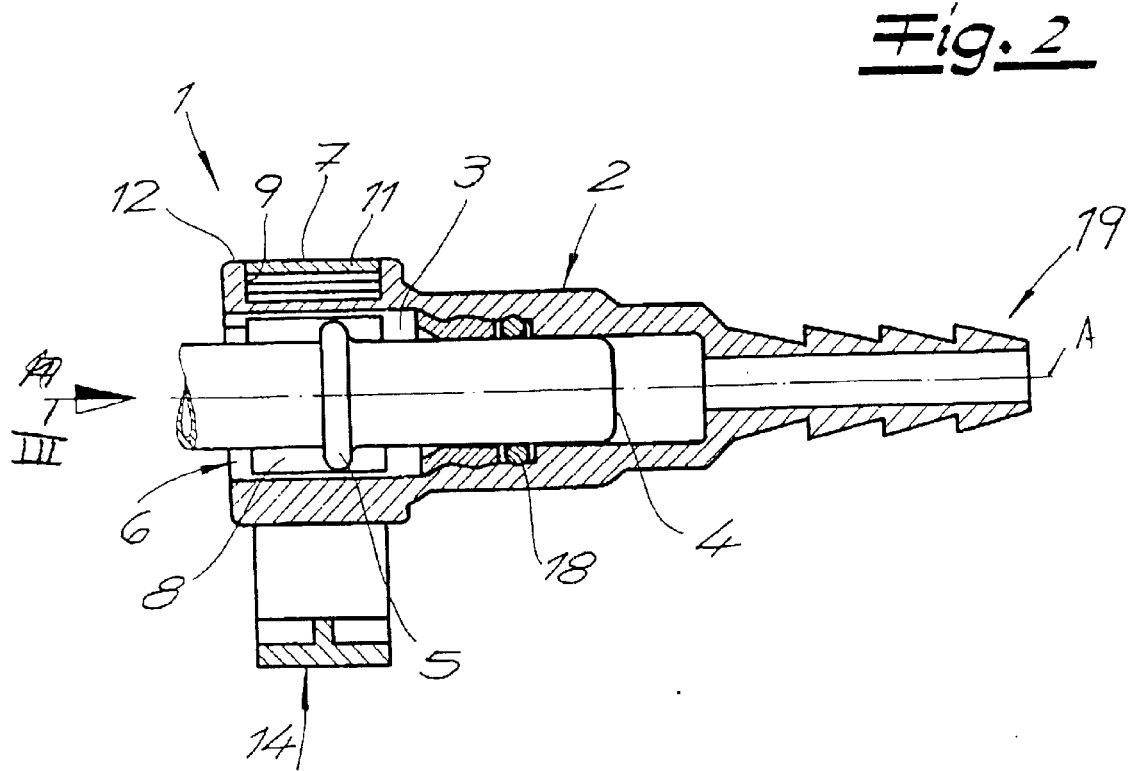
FIG. 2 is a view like FIG. 1 through the fitting with a tube end partially inserted into it.
Figure 4:
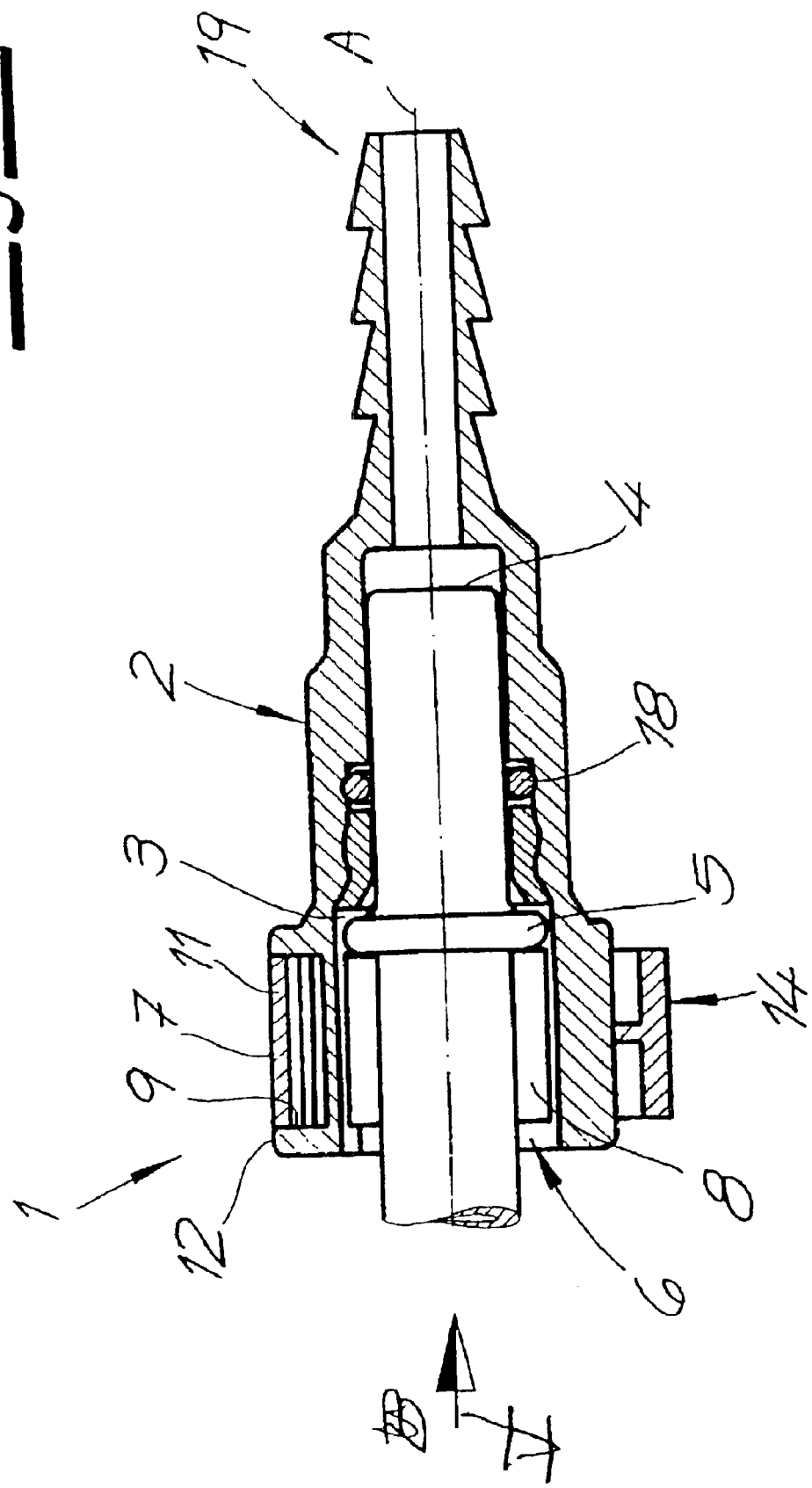
FIG. 4 is a view like FIG. 2 but with the tube end fully fitted into the fitting and locked in place therein.

As seen in FIG. 1 a fitting 1 has a molded-plastic body 2 formed centered on an axis A with an axially throughgoing passage in turn forming at one end a large-diameter rear seat 3 defined by a basically cylindrical wall 10 and having an axially rearwardly directed mouth 6. The opposite end of the body 2 is formed with a sawtooth-ridged extension 19 of standard design, adapted to fit in an unillustrated elastomeric hose. A basically cylindrical metal tube end 4 provided with a radially outwardly projecting retaining ridge 6 is adapted to be fitted to the seat 3. One or more O-ring seals 18 are provided in the seat 3 to engage tightly around the tube end 4.

A plastic U-shaped retaining clip 7 has two legs 8 projecting through respective holes 9 in the seat wall 10 and a bight portion 11 joining outer ends of the legs 8 and normally lying generally flush with an outer surface 12 of the wall 10. The seat 3 is formed with two parallel, confronting, and secantal grooves 13 that are open diametrally of the axis A toward each other. The clip 7 is elastically deformable and the legs 8 normally extend parallel to each other spaced radially inward from the floors of the grooves 13, but are elastically deformable away from each other into these grooves 13. In the normal position of the clip 7, its legs 8 are spaced apart by a distance equal to or slightly less than the diameter of the tube end 4.

A plastic U-shaped latch element 14 has a pair of legs 15 that are spaced apart somewhat more than the legs 8 and that can move between an outer position extending slightly into openings 16 formed in the seat wall 10 opposite the openings 9 and an inner position with the legs 15 projecting into the grooves 13 between the respective legs 8 and the floors of the grooves 13.

The fitting described above is used as follows:

To start with the clip legs 8 are clear of the floors of the grooves 13 and the latch element 14 is in its outer position, spaced radially somewhat outward from the outer surface 12 of the wall 11. Then the tube end 4 is poked axially into the seat 3, initially passing between the legs 8 and into the seal 8.

As the bump or ridge 5 passes between the legs 8 it will spread them somewhat, pushing the legs 8 back into the grooves 13 which, because the element 14 is in its outer position, are unobstructed. Once the ridge 5 passes the legs 8, they will snap elastically back in behind it, axially locking the tube end 4 in the body 2.

Then the user presses in the element 14, driving its legs 15 into the grooves 13 behind the legs 8 and thereby impeding them from moving back outward. The element 14 comes to rest against the outer surface as shown in FIG. 5 while projecting somewhat therefrom. In this position the tube end 4 is locked in the fitting 1.

To separate the tube end 4 from the fitting 1, the user first inserts a screwdriver or the like under the bight of the U-shaped element 14 and pulls it out into its outer position. Then the bight 11 of the clip 7 is pressed radially inward to spread the legs 8 and traction is exerted on the tube end 4 to pull it axially out of the fitting 1. The fitting 1 can be reused.

We claim:

1. In combination with a tube end having an outwardly projecting ridge, a fitting comprising:

a body formed with a seat centered on an axis, formed with a radially inwardly directed inner surface, and open axially rearwardly, the tube end being coaxially engageable in the seat;

a retaining clip on the body extending secantally across the seat and movable radially between an outer spread position engaging the inner surface of the seat and an inner retaining position spaced radially inward from the respective inner surface and projecting radially into the seat;

spring means urging the clip radially inward into the inner retaining position, the seat being dimensioned such that when the tube end is axially inserted into the seat the clip is deflected radially outward from the inner retaining position as the ridge moves axially past the clip and when fully axially inserted into the seat the clip is engaged axially rearward of the ridge with the tube end; and a latch element displaceable between an outer freeing position generally clear of the clip and an inner locking position engaged outward of the clip and bearing directly radially inward on the clip and radially outward directly on the inner surface and thereby preventing the clip from moving from the inner retaining position to the outer spread position.

2. The fitting defined in claim 1, further comprising a seal ring in the seat axially inward of the clip and engaged snugly between the seat and the tube end when the tube end is fully inserted into the seat.

3. The fitting defined in claim 1 wherein the clip is at least partially elastically deformable.

4. The fitting defined in claim 3 wherein the clip has a pair of legs extending secantally across the seat and each movable elastically radially of the axis between the spread and retaining positions relative to respective such inner surfaces.

5. The fitting defined in claim 4 wherein the clip is U-shaped and has a bight unitarily formed with the legs.

6. The fitting defined in claim 4 wherein the latch element projects radially from the body in the outer freeing position and is relatively closely juxtaposed with the body in the inner locking position.

7. The fitting defined in claim 4 wherein the latch element has a pair of legs engageable in the inner locking position between the clip legs and the respective surfaces.

8. The fitting defined in claim 7 wherein the latch element is U-shaped and has a bight interconnecting the respective legs.

9. The fitting defined in claim 1 wherein the clip and latch element are dimensioned such that in the locking position of the latch element the clip cannot move into the spread position, the tube end being axially locked in the body in the retaining position of the clip by engagement of the clip axially rearward with the ridge.

10. The fitting defined in claim 1 wherein the body is formed axially oppositely to the seat with a tubular end extension shaped to fit inside a rubber tube.

11. In combination with a generally cylindrical tube end having an outwardly projecting ridge, a fitting comprising:

a body formed with a seat centered on an axis and open axially rearwardly, the tube end being coaxially engageable in the seat, the body being formed in the seat with a pair of secantal grooves open diametrally toward each other and having radially inwardly directed floors;

a U-shaped retaining clip on the body having a pair of legs extending secantally across the seat and movable radially between outer spread positions engaged in the respective grooves of the seat and inner retaining positions spaced radially inward from the respective grooves and projecting radially into the seat;

spring means for urging the legs radially inward into the inner retaining positions, the seats being dimensioned such that when the tube end is axially inserted in the seat the legs are deflected radially outward from the inner retaining position as the ridge moves axially past the clip and when the tube end is fully axially inserted into the seat the legs are engaged axially rearward of the ridge with the tube end; and a latch element having a pair of legs and displaceable between an outer freeing position with the element legs generally clear of the clip legs and an inner locking position with the element legs engaged outward of the clip legs and bearing radially inward directly against the respective clip legs and radially outward directly against the floors of the respective grooves and thereby preventing the clip legs from moving apart from the inner retaining positions to the outer spread positions.

12. The fitting defined in claim 11 wherein the clip has an elastically deformable bight interconnecting the clip legs and constituting the spring means.

* * * * *